United States Patent [19]

Umpleby et al.

[11] 4,141,010

[45] Feb. 20, 1979

[54] DIGITAL ENCODER FOR DOOR OPERATOR

[75] Inventors: Kenneth F. Umpleby, Ann Arbor; William C. Apple, Brighton, both of Mich.

[73] Assignee: Multi-Elmac Company, Novi, Mich.

[21] Appl. No.: 674,595

[22] Filed: Apr. 7, 1976

[51] Int. Cl.$^2$ .............................. H04B 7/00
[52] U.S. Cl. .................. 343/225; 340/147 R; 340/167 R; 340/168 R; 325/37; 325/55; 325/64
[58] Field of Search ............... 343/225; 340/167 R, 340/167 A, 168 R, 168 B, 345, 346, 353, 354, 356, 147 R; 325/141, 142, 37, 55, 64; 332/9 R, 14; 49/25

[56] References Cited

U.S. PATENT DOCUMENTS

| | | | |
|---|---|---|---|
| 2,951,230 | 8/1960 | Cadden | 340/168 S |
| 3,387,270 | 6/1968 | Adlhoch et al. | 340/167 R |
| 3,397,401 | 8/1968 | Winterbottom | 325/152 |
| 3,510,780 | 5/1970 | Buehrle | 325/142 |
| 3,513,443 | 5/1970 | Andersen | 340/163 |
| 3,582,783 | 6/1971 | Hendrickson | 325/37 |
| 3,674,937 | 7/1972 | Bellanger | 332/9 R |
| 3,768,090 | 10/1973 | Williams | 340/167 R |
| 3,835,454 | 9/1974 | Palmieri et al. | 325/37 |
| 3,906,348 | 9/1975 | Willmott | 343/225 |

Primary Examiner—John W. Caldwell, Sr.
Assistant Examiner—Donnie L. Crosland
Attorney, Agent, or Firm—Krass & Young

[57] ABSTRACT

A digital radio control system comprising a transmitter for producing a repeating series of width modulated pulses, and a receiver responsive only to a series of predetermined pulse characters to actuate a load device such as a garage door operator. Both the transmitter and the receiver circuits comprise simple counter circuits and switches to define the pulse codes. The receiver counter is clocked by the transmitted pulse series and actuates the output circuit only if it reaches the final counter stage at least once.

4 Claims, 4 Drawing Figures

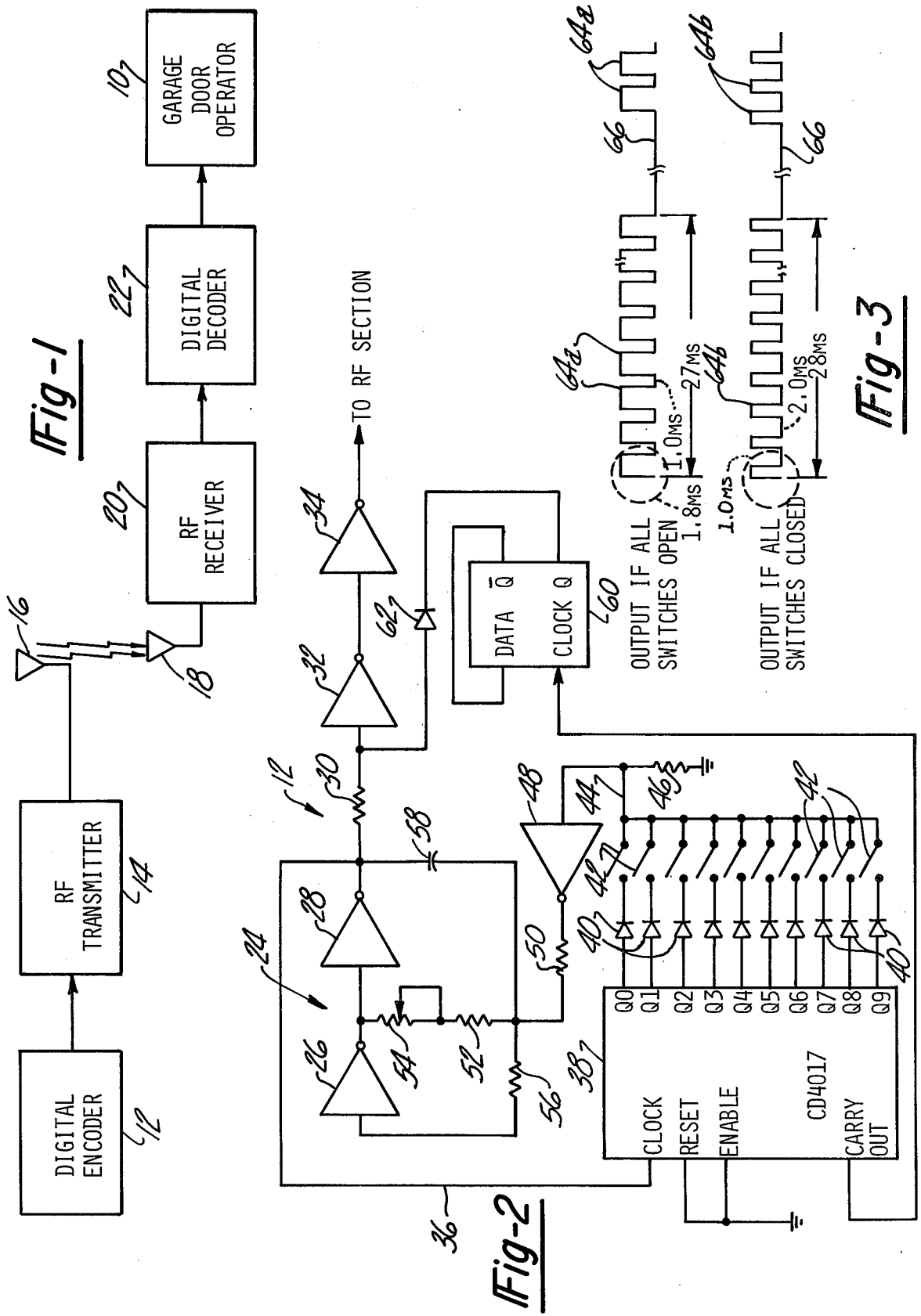

DIGITAL ENCODER FOR DOOR OPERATOR

INTRODUCTION

This invention relates to radio control systems for remote actuation of garage door operators and similar load devices and particularly to an improved means for generating and decoding a digital signal consisting of a series of modulated pulses.

BACKGROUND OF THE INVENTION

Remote actuation of garage door operators and similar loads has been accomplished traditionally by means of a radio control system wherein transmitters and receivers are matched to one another by frequency selection. An inherent disadvantage of this approach is the limited number of available carrier frequencies and the possibility of a match between transmitter and operator belonging to different persons.

One approach to a pulse code system which provides greater latitude in the number of available codes is disclosed in the patent to Willmott U.S. Pat. No. 3,906,348, issued Sept. 16, 1975. Willmott teaches the use of a transmitter having an eleven-stage shift register which is loaded in parallel with a selected pulse code by a plurality of two-position switches. The code is converted to serial by clocking the contents of the register onto a single line which controls an RF oscillator. The output is a series of width modulated pulses wherein bits of one value are represented by pulses of one width and bits of another value are represented by pulses of another width. The receiver/decoder of Willmott comprises a ten-bit shift register which receives the pulse series, another set of two-position switches which are programmed to define the admissible code and a network of gates to permit an instantaneous parallel comparison between all bits in both the received and preselected codes to determine whether of not an admissible code has been received. If all bits compare for three or more consecutive transmission cycles, the load is directly actuated by the output of the comparator.

BRIEF SUMMARY OF THE INVENTION

An objective of the present invention is to provide a radio control system capable of providing the advantages of the digital pulse code technique but with substantially improved economy, simplicity of operation, and reliability. Specifically, it is an objective of the invention to eliminate the shift registers of systems such as disclosed in the Willmott patent, to substantially reduce the number of logic elements required in Willmott type systems for code comparison, and to substantially simplify the detection of and response to both permissible and rejected code signals.

In general, this is accomplished by the provision of a transmitter for use in a radio control system wherein a simple resettable counter and a plurality of programmable devices such as switches connected to respective outputs of the counter comprise the principal elements of the pulse coding and decoding circuitry. Clock means in the transmitter are provided for producing output pulses for transmission to a remote receiver. The clock pulses advance the counter and the counter outputs modulate the character of the transmitter pulses according to the states of the programmable devices to provide a pulse series in which each pulse has one or the other of two possible characters, each character representing a digit value.

The receiver/decoder of the present invention also employs a simple resettable counter having plural outputs for providing a local pulse series representing the admissible code. Input means are provided such that the admissible pulse code series is presented, one pulse at a time, at a common output of the counter at the same rate as the transmitted pulses are received. A suitable device, such as a simple logic gate, is provided for sequentially comparing the transmitted pulses to the local pulse code, the output of this simple comparator being effective to reset the counter if any of the sequential pulse comparisons fails to indicate a match. The load is actuated only if the counter completes at least one complete cycle of operation. This is readily accomplished in the preferred embodiment by connecting the last stage of the counter to the load actuator amplifier, either directly or through a counter which requires two or more complete cycles of operation.

Various other features and advantages of the invention will be appreciated upon reading the following specification which is to be taken with the accompanying drawings.

BRIEF DESCRIPTION OF THE DRAWINGS

FIG. 1 is a block diagram of a radio control system for garage door operators and employing the basic building blocks of the subject invention;

FIG. 2 is a detailed schematic circuit diagram of a transmitter encoder constructed in accordance with the invention;

FIG. 3 is a wave form diagram illustrating the signal which is output and transmitted by the circuit of FIG. 2; and, FIG. 4 is a detailed schematic circuit diagram of a receiver decoder constructed in accordance with the invention and operable with a transmitter encoder of the type shown in FIG. 2.

DETAILED DESCRIPTION OF THE SPECIFIC EMBODIMENT

Figure 4:
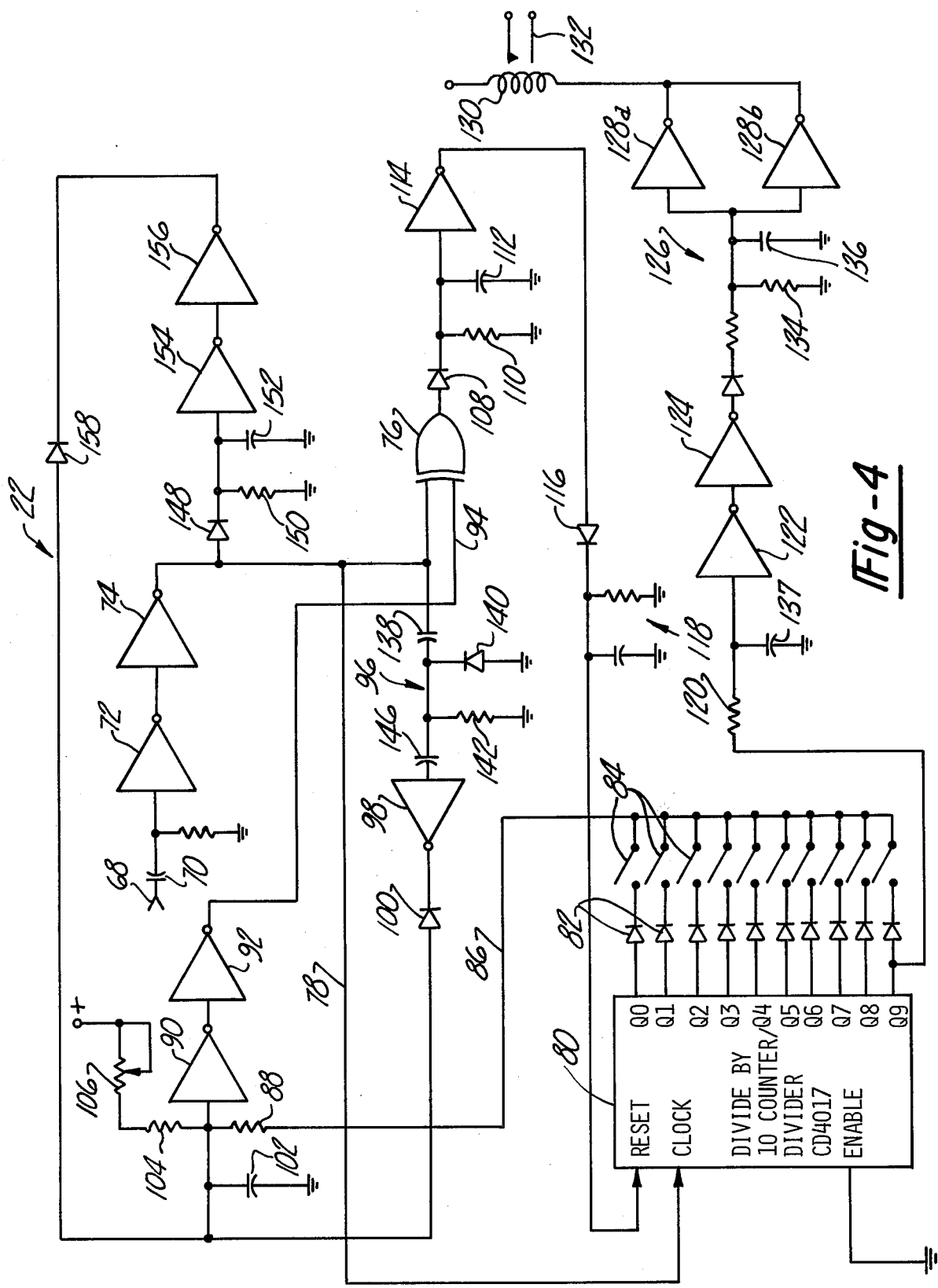

FIG. 1 illustrates a garage door operator 10 of the type in which an electric motor may be caused to drive the garage door between upper and lower limits of travel. A suitable operator is available from Vemco Products Division of Stanley Works, Detroit, Michigan. Remote operation of the garage door operator 10 may be accomplished by means of a hand-held, battery-operated transmitter having a digital encoder 12 for producing an output signal consisting of a series of pulses, each pulse representing one of two possible digit values; i.e., "1" or "0". The output of encoder 12 is connected to a standard RF transmitter 14 which reproduces the digital pulse train and radiates it into the air in the form of an electromagnetic wave at a predetermined carrier frequency by way of antenna 16. As hereinafter described in greater detail, the transmitted pulse code comprises a series of ten pulses followed by a blank space and two or more repeat cycles.

At the receiver, antenna 18 picks up the transmitted pulse train and inputs to an RF detector 20. The reproduced transmitted pulse train is applied to a digital decoder 22 where it is compared, pulse by pulse, to a locally preset code. If a match occurs, the output of decoder 22 actuates the garage door operator 10. If there is no match, decoder 22 produces no output.

In FIG. 2 details of the digital encoder 12 are shown. Oscillator 24 comprises inverter sections 26 and 28 for producing output pulses of varying width. These pulses are transmitted through fixed resistor 30 and inverter sections 32 and 34 to the RF transmitter section 14 of the transmitter circuit shown in FIG. 1. To program or modulate the output pulses from oscillator 24 the output of inverter section 28 is connected by way of conductor 36 to the clock input of a resettable counter 38. The counter is preferably an integrated circuit such as a CD 4017 having ten outputs which are actuated in sequence by the leading edge of signals applied to the clock input. As each successive output goes high, the preceding output goes low, and accordingly, the application of ten consecutive clock pulses to the counter 38 by oscillator 24 results in the sequential energization of all of the ten outputs $Q_0$ through $Q_9$. Each output goes low when the next one goes high. Clock outputs are connected through diodes 40 and programmable two-position switches 42 to a common output conductor 44 such that pulses and the absence of pulses appear on line 44 in a serial pattern depending upon the states of the individual switches 42. The switches are preferably Grayhill programming switches available in sets of ten and having easily positionable rocker arm actuators. However, the term "two-position switch" as used herein is meant to encompass a wide variety of devices such as plug-in diode switches, punch-out foil, and others.

Common output line 44 is connected to ground through the resistor 46 and also through an inverter 48 and a fixed resistor 50 to the oscillator 24. The side of resistor 50 closest to the oscillator is connected through fixed resistor 52 and variable resistor 54 to the midpoint between inverter sections 26 and 28. Resistor 50 is also connected through large fixed resistor 56 to the input of inverter section 26 and through capacitor 58 to the output of inverter section 28.

The resettable counter 38 together with the switches 42 has the effect of modulating the width of the pulses which are produced by the oscillator 24; i.e., for each oscillator pulse time during which an actuated switch 42 is open the pulse time is 1.8 ms and for each oscillator pulse time during which an actuated switch 42 is closed, the pulse time is 1.0 ms. As hereinafter described, the width modulation of the pulses has the effect of assigning respective bit values thereto such that the resulting ten bit serial output code may be thought of as consisting of a series of ones and zeros, each uniquely programmable set of ones and zeros being recognizable by a receiver which is tuned to the same pulse code.

The circuit of FIG. 2 is operable in the case of a small hand-held transmitter by pressing a switch (not shown) which applies battery potential to all of the active components of the circuit. This starts the free running oscillator 26, 28 to produce pulses in groups of ten, the digit value of each pulse being determined by the state of the corresponding switch in switch group 42. Oscillator 26, 28 runs continuously when the battery potential is applied, but the encoder output is blanked every ten pulses to produce dead times 66 equal in time duration to ten pulses. To accomplish this, the "carry" output of counter 38 is connected to one input of a flip-flop 60. The Q output is connected via diode 62 to the input of inverter 32 to block and unblock the transmission of the modulated pulse train. The other input of flip-flop 60 is short circuited to the $\bar{Q}$ output. Flip-flop 60 thus produces a fifty percent duty cycle for the overall pulse transmission operation even though the oscillator 26, 28 is free running.

FIG. 3 illustrates two waveforms or pulse train signals representing opposite extremes of operation of the circuit of FIG. 2. The upper waveform is that which is generated if all of the switches 42 are open. A series of ten pulses 64a each of 1.8 ms duration is generated. A dead time or blank 66 of approximately 27 ms follows and then the pulses repeat. The half period of the oscillator is 27 ms with the time between pulses 64a being approximately 1 ms. The lower waveform illustrates the output if all of the programming switches 42 are closed. Pulses 64b are produced having a width or duration of only 1.0 ms and the time between pulses is 2.0 ms for a half period of 28 ms. A blank or dead time 66 follows and the pulse series 64b repeats. Obviously, if some of the switches 42 are open and some are closed, the result is a pulse train representing a mix of the wide and narrow pulses 64a and 64b respectively. In fact, while the extremes of all zeros and all ones are illustrated, it is unlikely that either code would be recommended but rather that some preselected mix of ones and zeros would be used.

Looking now to FIG. 4, the details of the digital decoder 22 are illustrated. In the circuit 22 the transmitted and received pulse train from the RF receiver section appears on input 68 and is applied through capacitors 70 to a buffer amplifier section made up of two inverting sections 72 and 74. The amplified and non-inverted pulse train is applied to one input of a comparator 76 in the form of a single EXCLUSIVE-OR gate such as a CD 4030. The purpose of the comparator 76 is to compare each pulse of the received pulse train with each corresponding pulse of a local pulse code in a sequential fashion to determine whether or not a match exists.

To accomplish this function the received pulses are applied by way of conductor 78 to the clock input of a programmable counter 80 which may be structurally identical to counter 38 previously described with reference to FIG. 2. Counter 80 also has ten sequentially energized outputs connected through diodes 82 to one terminal of each of a plurality of two-position switches 84. Once again the switches 84 may take a variety of forms. The other terminal of each of the switches 84 is connected to a common line 86 connected through resistor 88 to the input of a pulse generator comprising inverting amplifier sections 90 and 92. The output of section 92 is connected by way of line 94 to the other input of comparator gate 76.

The signal received on input 68 not only carries data for identification purposes, but also starts and times the production of locally-generated code pulses for comparison purposes. Each received pulse, regardless of data content, is applied via differentiator circuit 96 and inverter 98 to pulse generator 90, 92 to trigger an output. The digital value of the pulse output by generator 90, 92 is determined by the condition of the switch 84 connected to the output of counter 80 which goes high at the same time. Since the received pulses clock the counter 80, a ten-count cycle is produced by each pulse burst received unless the count is terminated by an error in the received code; i.e., a mismatch between the digit value of a received pulse and its counterpart pulse in the locally-generated code. An error resets the counter 80. Closed switches 84 connect resistor 88 into the timing circuit of pulse generator while open switches do not, the result is a variation in the width of the pulses of the locally-generated code according to the pattern of settings of switches 84.

To synchronize the operation of pulse generator 90, 92 with the received signal, the output of inverter section 74 is connected through capacitor 138 and differentiator 96 to an inverter section 98 and diode 100 and thence back to the input of section 90 of the pulse generator. A capacitor 102 is connected in shunt to ground and forms part of the timing circuit for the pulse generator 90, 92. For each wide pulse on common line 86 representing an open switch, the time constant of pulse generator 90, 92 is established by capacitor 102 in combination with fixed resistor 104 and variable resistor 106. For each narrow pulse representing a closed switch 84 the time constant is established by the aforementioned circuit in combination with resistor 88. As previously mentioned, the result is an output from the pulse generator 90, 92 fully representing the data pattern of the opened and closed switches 84.

The output of EXCLUSIVE-OR gate 76 represents a pulse-by-pulse comparison between the received pulse train and the locally-generated pulse train. The output from gate 76 is connected through diode 108, shunt resistor 110 and shunt capacitor 112 to the input of inverter section 114. The output of inverter section 114 is connected through diode 116 and filter 118 to the reset input of counter 80 to reset the counter and stop the comparison should any pair of pulses fail to match. Capacitor 112 stays charged as long as the output of EXCLUSIVE-OR gate 76 is high indicating a continuing match between the two inputs; i.e., the inverted local code and the non-inverted remote code. If the output of EXCLUSIVE-OR gate 76 goes low, capacitor 112 is discharged through resistor 110 causing the output of inverter 114 to go high and resetting counter 80. Obviously, the RC circuit 110, 112 has some time constant to render the circuit insensitive to noise and small circuit delay times but sensitive to the receipt of an incorrect code.

The output circuit to the remotely controlled device is taken from the last output of counter 80 to go high during any complete count cycle. The $Q_9$ output of counter 80 is connected through resistor 120 and inverter sections 122 and 124 to a counter circuit 126 including a capacitor 136 which is fully charged only after some predetermined number such as two or three complete cycles of clock 80 are achieved. Capacitor 136 is connected through hex inverter sections 128a and 128b to control the actuation or energization of a solenoid coil 130 which in turn controls contacts 132. The contacts 132 may control a standard electric garage door operator or such other load as one may wish to control from a remote point by the radio link of the subject device. Inverter sections 128 may be replaced with a Darlington amplifier circuit as will be apparent to those skilled in the art. Counter circuit 126 is of course an optional feature as it is possible to effect operation of the output circuit on the first full cycle of operation of counter 80.

The pulse generator 90, 92 must be blanked between pulse bursts. To accomplish this, the outut of inverter 74 is connected via a feedback path to the input of inverter stage 90. This path comprises a diode 148, RC filter circuit 150, 152, inverters 154 and 156, and diode 158. The time constant of RC filter circuit 150 and 152 is much larger than pulse widths of the 10 input pulses, thus filtering them out, which results in a voltage feedback signal which is high during the received pulse train and low at all other times. When this voltage is low the input of 90 is held low.

By way of circuit detail it is apparent that resistor 110 and capacitor 112 form a holding circuit to prevent the occurrence of a reset pulse as long as the received pulses match the locally-generated pulses during the sequential pulse comparison step. Differentiator 96 comprises a combination of capacitor 138, resistor 142 and diode 140. A capacitor 137 is connected between the input to inverter section 122 and ground as shown.

OPERATION

Although the operation of the transmitter and receiver devices is believed to be apparent from the text, a brief description of operation will now be given.

When the supply voltage is applied to the active components in the transmitter circuit of FIG. 2, oscillator 24 begins running, but is modulated by counter 38 and switches 42, and blanked by the flip-flop 60. As a result, encoder 12 produces a repeating series of ten pulses in which the character of each pulse is representative of a digital value either "1" or "0". For purposes of discussion, a wide pulse 64a represents a zero and a narrow pulse 64b represents a one. The character of the individual pulses in the ten-pulse train is determined by the condition of the individual switches 42.

At the receiver the transmitted pulse train is applied in substantially original form to one input of the logic element comparator 76. The transmitted pulse train is also applied to the clock input of counter 80, and through differentiator 96 and inverter 98 to the pulse generator 90, 92. The pulse generator 90, 92, in combination with the counter 80 and programming switches 84 produces an inverted local pulse code train on line 94 which is applied to the other input of the comparator 76. As long as each transmitted and received pulse matches its locally-generated counterpart, the output of the gate 76 remains high and the holding circuit 110, 112 allows the counter 80 to continue to advance. If all ten pulses match, counter 80 advances to the energization of the $Q_9$ output and the coil 130 is energized to close contacts 132. The remote load is then operated. As previously described, capacitor 136 may be set to require two or three cycles of counter 80 before the output operation is effected. If a mismatch in any of the sequentially compared pulses occurs, holding circuit 110, 112 immediately resets counter 80 before any additional pulses are received. The output operation is thus withheld. Counter 80 is reset in any event at the end of each ten-pulse half cycle.

It is to be understood that the foregoing description is illustrative in nature and that many modifications including substitutions and rearrangements of circuit elements and time periods are possible.

The embodiments of the invention in which an exclusive property or privilege is claimed are defined as follows:

1. A digital radio control system for actuating a controlled device in response to the transmission and receipt of a digitally coded signal consisting of a series of pulses each having one of two possible timing characters representing digit values and comprising:
 a selectively operable digital pulse sequence transmitter comprising a free-running oscillator, a pulse timing circuit connected to said oscillator, a recycling counter having plural outputs equal in number to the number of pulses in the sequence to be transmitted, a plurality of two-position switches connected between respective counter outputs and said pulse timing circuit for controlling oscillator pulse timing according to the state of each two-position switch as the counter output associated therewith is activated, means connecting the oscillator to the counter to advance and recycle same, whereby said transmitter produces a repeating series of time modulated pulses, the individual timing characters of which are determined by the conditions of said two-position switches;

said control system further including a receiver having a radio transmission pulse input means, a second recycling counter having plural outputs equal in number to the number of pulses in said series to be transmitted and received, a second plurality of two-position switches connected to respective outputs of said second counter to be actuated thereby as said counter is advanced, a pulse generator connected to said radio pulse input means to produce a pulse for each radio pulse received by said input, means connecting said radio transmission pulses to said second counter to advance same, second timing control means connected to said second pulse generator to control the timing of said generated pulses therefrom, the two-position switches being commonly connected to the second timing control means for controlling the timing of said pulses therefrom in accordance with the settings of said second two-position switches, comparator means having two inputs and an output, the inputs being connected to receive the radio transmitted pulses and the locally generated pulses from said pulse generator and for comparing the timing values thereof, the output being connected to said second counter for resetting same in the event of a non-coincidence of pulses applied to the inputs of said comparator means, an output means connected between said second counter means and said controlled device to actuate same only if said second counter is advanced through at least one full cycle by a coincidence of pulses applied to the respective inputs of said comprator means during said repeating radio pulse transmission cycle.

2. Apparatus as defined in claim 1 wherein said transmitter further comprises means for blanking the output of said free-running oscillator during alternate coded signal series whereby the transmitter exhibits a 50% duty cycle.

3. Apparatus as defined in claim 2 wherein said receiver includes means for blanking the output of said pulse generator except upon receipt of radio transmitted pulses at said input means.

4. For use in a digital radio controlled system for actuating a controlled device in response to the transmission and receipt of a digitally coded signal consisting of a series of pulses each having one of two possible timing characters representing digit values:

a receiver/decoder responsive to a spaced repeating series of timing-modulated pulses for comparing same to the individual timing modulated values of a locally generated pulse series and comprising radio transmitted pulse input means, a recycling counter having plural outputs equal in number to the number of pulses in said series, a plurality of two-position switches connected to the outputs of said counter to be individually actuated as said counter is advanced, pulse generator means connected to be actuated by radio transmitted pulses applied to said input means so as to produce a locally generated pulse for each radio pulse received by said input means, means connecting radio transmitted pulses received by said input means to said counter to advance same, timing control means connected to the pulse generator for controlling the timing of said locally generated pulses produced thereby, the two-position switches being commonly connected to the timing control means such that the locally generated pulses are modulated in timing according to the positions of said two-position switches as said counter means is advanced, comparator means connected to receive the radio transmitted and received pulses as well as the locally generated pulses and to compare the timing qualities thereof on an individual pulse basis, the output of the comparator means being connected to reset said counter when the timing qualities of pulses simultaneously applied to said comparator means are dissimilar, and output means connected to a selected output of the counter to actuate the controlled device when the counter is advanced sufficiently to actuate said selected output at least once.

* * * * *